United States Patent

[11] 3,615,178

| [72] | Inventors | Fabrizio Guicciardi;<br>Paolo Palagi, both of Novara, Italy |
|---|---|---|
| [21] | Appl. No. | 820,663 |
| [22] | Filed | Apr. 30, 1969 |
| [45] | Patented | Oct. 26, 1971 |
| [73] | Assignee | Montecatini Edison S.p.A.<br>Milan, Italy |
| [32] | Priority | May 3, 1968 |
| [33] | | Italy |
| [31] | | 16033A/68 |

[54] PROCESS FOR THE PURIFICATION OF TITANIUM TETRACHLORIDE FROM TRACES OF CARBON COMPOUNDS
3 Claims, No Drawings

[52] U.S. Cl. .................................................... 23/87 TP,
23/87 T, 23/202 V
[51] Int. Cl. .......................................................... C01g 23/02
[50] Field of Search ............................................ 23/87 TP,
87 T, 202 V

[56] References Cited
UNITED STATES PATENTS

| 2,207,597 | 7/1940 | Pechukas ..................... | 23/87 X |
| 2,344,319 | 3/1944 | Meister ........................ | 23/87 X |
| 2,915,364 | 12/1959 | Clabaugh et al. ............. | 23/87 |
| 3,328,126 | 6/1967 | Di Stefano et al. ........... | 23/202 |
| 3,350,171 | 10/1967 | Callow et al. ................. | 23/202 |

FOREIGN PATENTS

| 1,457,538 | 11/1966 | France ......................... | 23/87 |

Primary Examiner—Edward Stern
Attorney—Stevens, Davis, Miller & Mosher

ABSTRACT: This application discloses a process for purifying titanium tetrachloride from the carbon residues resulting from the purification of $TiCl_4$ by means of organic compounds, the raw titanium tetrachloride being treated with aluminum trichloride at temperatures ranging between 100° C. and boiling temperature, and in the presence of from 0.01 to 1 percent (by weight of the $TiCl_4$) of finely divided $TiO_2$ having a particle size ranging between 0.05 and 10 microns.

PROCESS FOR THE PURIFICATION OF TITANIUM TETRACHLORIDE FROM TRACES OF CARBON COMPOUNDS

The present invention relates to a process for the purification of titanium tetrachloride from carbon compounds.

It is well known that the $TiCl_4$ used in the preparation of $TiO_2$ by combustion must meet rather stringent requirements of purity in order to yield a $TiO_2$ product with satisfactory pigmentary characteristics.

While some of the substances present in the raw $TiCl_4$ as impurities may be separated in a practically quantitative way by physical methods, this is not the case with the vanadium compounds present, for which it is necessary to resort to chemical methods of separation.

One of the methods most frequently in use at the present time consists in treating the raw $TiCl_4$ with organic compounds, preferably mineral or vegetable oils, which change the vanadium salts into nonvolatile compounds U.S. Pat. Nos. 2,230,538, 2,592,021, 2,824,050 and 3,156,630).

This method has, however, the disadvantage of leaving in the purified $TiCl_4$ traces of carbon compounds which exert a harmful action on the subsequent process of combustion to $TiO_2$.

These carbon compounds normally are separated from the $TiCl_4$ in the form of flakes, by the addition of small amounts of $AlCl_3$ to the hot $TiCl_4$, preferably at the boiling point of $TiCl_4$ (136.4° C.) (French Pat. No. 1,457,538). This method, however, is not satisfactory for several reasons.

In fact, on the basis of our experimental tests, we have found that at the boiling temperature of the $TiCl_4$ the addition of increasing amounts of $AlCl_3$, varying from 0.5 to 2.5 percent by weight of $TiCl_4$, does not cause a parallel drop of the settling time which remains in general greater than 25 minutes. The treatment with $AlCl_3$ at temperatures below the boiling point, up to 100° C. involves very high settling times or the use of too high percentages of $AlCl_3$.

Furthermore, it has been found that the values of the settling times obtained by repeated tests vary widely. This phenomenon must be attributed to the light flaky nature of the product separated, following the action of the $Alcl_3$.

In fact, the convection motions which are generated inside the liquid mass of $TiCl_4$ by the effect of thermal gradients prevent the settling of the impurities, or else bring these back into suspension once they have settled, thus preventing the formation of a clear solution suitable for subsequent use.

The object of this invention is to provide a process for the purification of $TiCl_4$ from carbon compounds, which shall not show any of the disadvantages of the methods of the above-cited prior art.

More particularly, an object of this invention is that of providing a process for the purification of $TiCl_4$ from carbon compounds through the addition of aluminum chloride by means of which are obtained, with very short settling times, deposits of impurities of such a compactness and density as to prevent their redispersion and to allow an easy decantation of the clear supernatant $TiCl_4$.

These and still further objects are attained by means of this invention, according to which it has been found that the presence in the mixture of $TiCl_4$ and $AlCl_3$ of small quantities of finely divided $TiO_2$, in quantities varying from 0.01 to 1 percent, but preferably from 0.1 to 0.5 percent by weight of the $TiCl_4$, not only reduces the settling time, but also generates a compact and dense deposit, which does not disperse again easily. The particle size of the $TiO_2$ used for the purpose varies from 0.05 to 1 micron, although also greater particle sizes, such as from 5 to 10 microns or particle aggregates still yield good results.

$TiO_2$ is preferred for this use because it avoids contamination of the treated $TiCl_4$ to be used in the successive combustion step. However, other inorganic substances inert towards $TiCl_4$, and of high specific surface (in particular metal oxides such as $SiO_2$, $Al_2O_3$, $ZrO_2$, etc. may also be used and will produce equally satisfactory results.

The treatment of the $TiCl_4$ with $AlCl_3$ in the presence of $TiO_2$ is carried out with vigorous stirring, at temperatures between 100° C. and the boiling point of $TiCl_4$, preferably at the latter temperature, with stirring periods of from 90 to 15 minutes.

Once the predetermined time interval has elapsed, the stirring and heating are discontinued, allowing the temperature to drop below the boiling point, for instance to 90° C. The precipitate is thus to settle and the clear $TiCl_4$ is then separated.

The following detailed working example is given merely still further to illustrate the invention:

EXAMPLE

The testing apparatus consists of a graduated pyrex cylinder with a conical bottom, provided with an efficient stirring system, a thermometer and a condenser, immersed in a thermostatic bath.

Into 860 g. of $TiCl_4$ of commercial quality, which had been treated with oleic acid for separating the V compounds, and still containing 0.02 percent (expressed as C) of carbon compounds, are introduced varying amounts of $TiO_2$ (see the table) with a particle size ranging between 0.1 and 0.5 micron and heated in the cylinder up to the boiling point. Thereupon are added 4.3 g. of $AlCl_3$ in an inert atmosphere while the mixture is kept at the boiling temperature for one hour with vigorous stirring.

The stirring is then discontinued and the temperature of the system reduced to 90° C. The values of the settling times obtained in the presence of the $TiO_2$ are well reproducible, while —as clearly appears from the following table—in the absence of $TiO_2$ these values vary widely.

TABLE

| $TiO_2$ in the $TiCl_4$ % | Settling time at 90° C. minutes |
|---|---|
| 0 | 55 |
| 0 | 30 |
| 0 | 25 |
| 0 | 60 |
| 0.01 | 20 |
| 0.05 | 12 |
| 0.1 | 2 |
| 0.4 | 2 |
| 0.5 | 3 |
| 1.0 | 1 |

What is claimed is:

1. A process for purifying titanium tetrachloride from the carbon residues resulting from the purification of the titanium tetrachloride by means of organic compounds, which comprises the steps of:
   a. admixing the raw titanium tetrachloride with aluminum chloride, wherein the aluminum chloride is from 0.5–2.5 percent by weight of the titanium tetrachloride;
   b. subjecting the mixture to (1) vigorous stirring in an inert atmosphere, and (2) at a temperature from between 100° C. and the boiling point of the titanium tetrachloride, and (3) for 15 to 90 minutes, and (4) in the presence of from 0.1–1 percent, based on the weight of the titanium tetrachloride, of finely divided $TiO_2$ with a particle size of from 0.05 to 10 microns:
   c. cooling the resultant mixture;
   d. separating the compact and dense precipitate of the carbon residues, which has a settling time of from about 1 to about 3 minutes, from the purified titanium tetrachloride.

2. A process according to claim 1, wherein the $TiO_2$ is used in amounts ranging from 0.1 to 0.5 percent by weight with respect to the $TiCl_4$.

3. A process according to claim 1 wherein the $TiO_2$ is used in particle sizes between 0.05 and 1 micron.